Dec. 8, 1953   J. F. JOY   2,661,493
VACUUM TYPE LEAF SWEEPER
Filed Jan. 7, 1949   2 Sheets-Sheet 1

Inventor:
Joseph F. Joy,
by Charles F. Osgood,
Attorney.

Dec. 8, 1953 J. F. JOY 2,661,493
VACUUM TYPE LEAF SWEEPER
Filed Jan. 7, 1949 2 Sheets-Sheet 2

Inventor:
Joseph F. Joy.
by Charles F. Osgood,
Attorney.

Patented Dec. 8, 1953

2,661,493

UNITED STATES PATENT OFFICE 2,661,493

VACUUM TYPE LEAF SWEEPER

Joseph F. Joy, Pittsburgh, Pa., assignor to Joy Manufacturing Company, Pittsburgh, Pa., a corporation of Pennsylvania Application January 7, 1949, Serial No. 69,735

15 Claims. (Cl. 15—350)

1

This invention relates to sweeping apparatus, and more particularly to a vacuum type leaf sweeper for gathering leaves or similar loose material from the ground surface over which the machine travels.

While innumerable vacuum sweepers have been devised, none so far as is known are capable of successful operation in the gathering of loose material such as leaves disposed on an uneven ground surface. The present invention contemplates improvements in vacuum type leaf sweepers in that a movably mounted raking device is located in a novel manner in adjacency to and rearwardly of the nozzle of the suction device so that the incoming air is drawn into the machine between the teeth of the rake, thereby effectively drawing the loose leaves in advance of the rake into the collecting receptacle of the machine. Associated with the suction device is means for shredding the leaves, resulting in better decomposition of the leaves when used in compost beds. In accordance with the present invention, the rake is mounted for pivotal movement and may be adjusted between its raised position and its lowered operative position, and when lowered is so arranged with respect to the nozzle and the nozzle is so designed that the leaves gathered by the rake are effectively drawn into the machine. The fan of the suction device has sharpened edges, so that the leaves are shredded as they are gathered.

An object of the present invention is to provide an improved vacuum sweeper apparatus. Another object is to provide a vacuum type leaf sweeper for gathering leaves or similar loose material from an uneven ground surface and having improved raking means embodied therein for gathering the leaves in adjacency to the nozzle of the machine. A further object is to provide an improved vacuum type leaf sweeper having improved raking means arranged in a novel manner with respect to the mouth of the sweeper nozzle, whereby the air is drawn into the sweeper between the rake teeth, resulting in a more effective gathering action. Yet another object is to provide an improved leaf sweeper having improved flexible shielding means to prevent the drawing in of a substantial quantity of air at the front of the nozzle so that the main volume of air is drawn from a rearward direction into the machine. A still further object is to provide an improved adjustably mounted raking device arranged and mounted in a novel manner with respect to the sweeper nozzle. Still another object is to provide an improved flexible air directing

2 means or shield associated with the pivoted rake so that air is effectively drawn into the machine past the rake. These and other objects and advantages of the invention will, however, hereinafter more fully appear.

In the accompanying drawings, in which one form of the invention is shown for purposes of illustration, Fig. 1 is a plan view, with parts broken away to show details of construction, of a leaf sweeper and shredder constructed in accordance with an illustrated embodiment of the invention.

Figure 1:
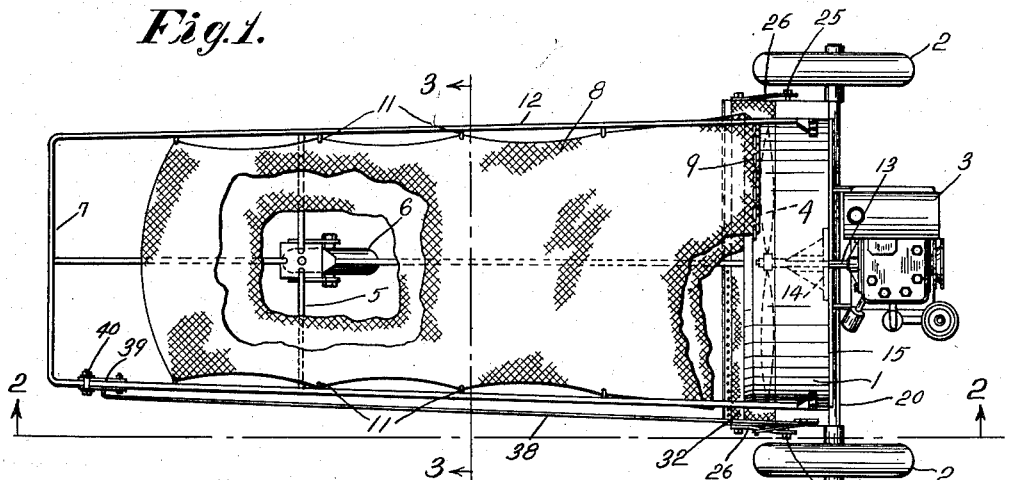

In this illustrative construction, as shown in the drawings, the leaf sweeper and shredder generally comprises a fan housing 1 mounted on rubber tired wheels 2 and carrying a prime mover 3 for driving a suction creating fan 4 in the housing. A frame structure 5, herein desirably composed of tubular rods or pipe, is secured to the housing and extends horizontally rearwardly and is supported at its rear end by a suitable rubber tired, swiveled caster wheel 6. The frame is appropriately shaped to provide a rearwardly located handle 7 whereby the machine may be manually guided and propelled. A leaf collecting receptacle 8 as for example a bag of any suitable loosely woven material, such as burlap, is detachably secured as by a drawstring 9 or otherwise to an annular rearward portion 10 of the fan housing, and the bag is supported as by suitable clips 11 on the upper horizontal side frames 12 of the frame structure 5. The annular portion 10 is flared at 10' to prevent the bag from slipping off of the housing, when attached by the drawstring. By the provision of the burlap bag with its loosely woven fabric, the building up of any substantial back pressure within the bag is prevented. The prime mover 3 is desirably in the form of an internal combustion engine having its power shaft 13 suitably journaled in a bearing bracket 14 secured to the front wall 15 of the fan housing. The fan 4 is secured to and driven by the shaft and is adapted to draw air upwardly through a nozzle 16 and an air duct 17, and to discharge air through an air duct 18 rearwardly through the annular housing portion 10 into the bag. The advance edges of the fan blades of the suction device are sharpened at 19 so that the leaves are chopped up or shredded as they are drawn through the air ducts 17 and 18.

Figure 2:
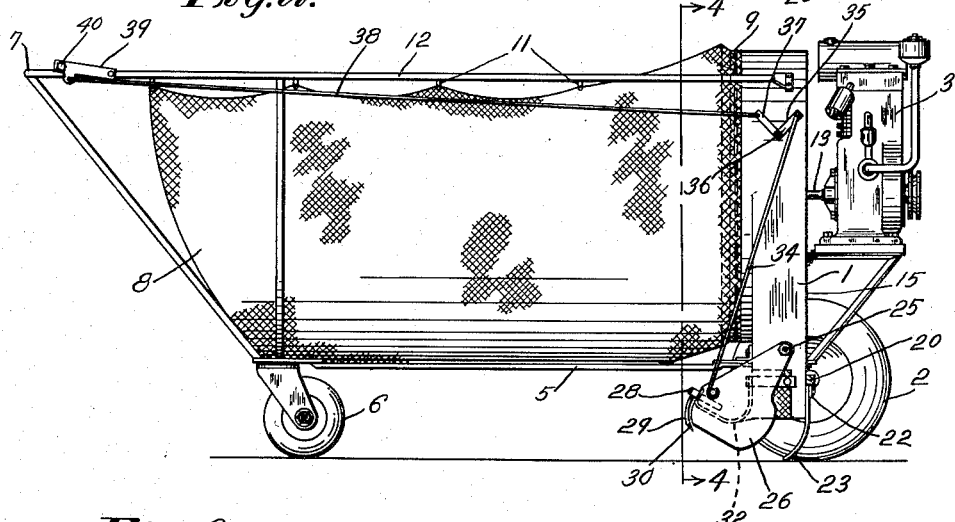
Fig. 2 is a side elevational view of the leaf sweeper and shredder shown in Fig. 1.
Figure 3:
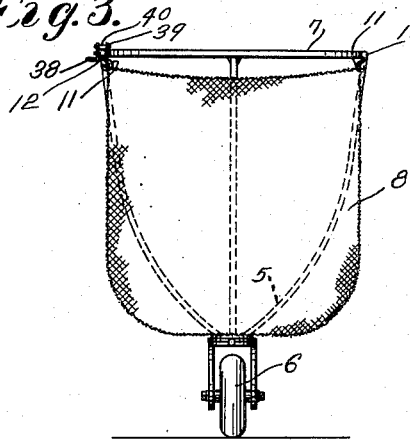
Fig. 3 is a cross sectional view, taken substantially on the line 3—3 of Fig. 1, showing the leaf collecting bag and rear caster wheel.
Figure 4:
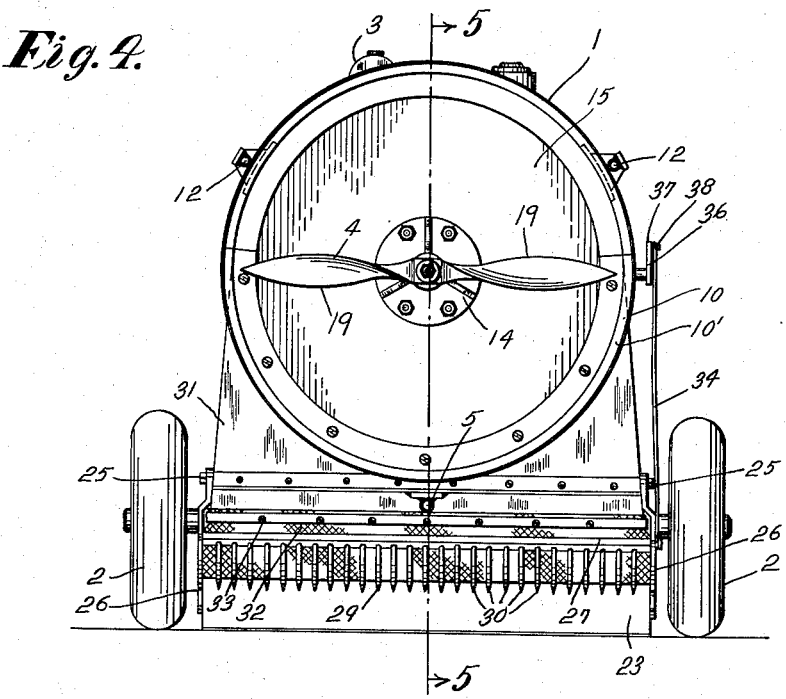
Fig. 4 is an enlarged cross sectional view taken substantially on line 4—4 of Fig. 2.
Figure 5:
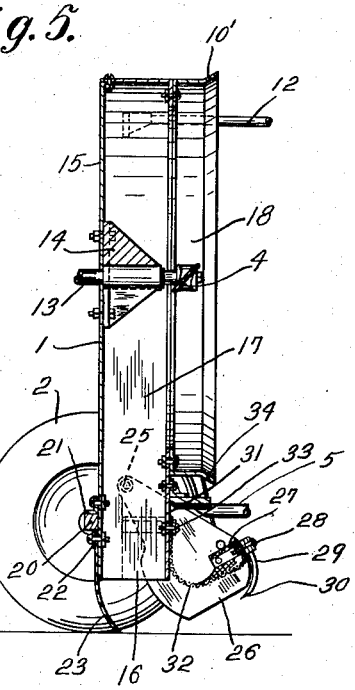
Fig. 5 is a detail view in longitudinal vertical section taken on line 5—5 of Fig. 4, showing the rake in raised position.
Figure 6:
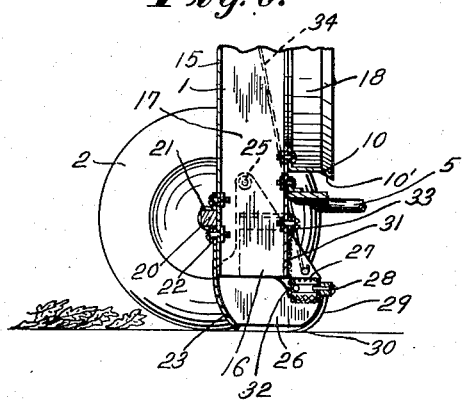
Fig. 6 is a fragmentary sectional view taken on the plane of Fig. 5, showing the rake in lowered operative position.

The front wheels 2 are suitably journaled on a transverse axle 20 having a rectangular portion secured at 21 to the front housing wall 15 and clamped to the housing wall at 22 is a yieldable shield 23, herein preferably composed of rubber or rubber impregnated fabric, and this shield extends downwardly into yielding contact with the ground surface so that any large volume of air is prevented from being drawn from the front of the machine into the nozzle. As the machine is moved forwardly, this flexible shield assumes the rearwardly bent or deflected position with respect to the ground surface, as shown in Figs. 2, 5 and 6, so that relatively tight contact with the ground surface is attained while permitting the shield to pass relatively freely over the leaves or any obstruction on the ground.

In this improved construction, pivoted at 25 at the sides of the fan housing are arms 26 to which a transverse bar 27 is secured. Suitably detachably secured as by screws 28 to the cross bar is a rake 29 having downwardly curved teeth 30. Extending across the rear wall 31 of the fan housing is a flexible housing member 32, herein formed of a closely woven fabric such as canvas, and this flexible member is suitably secured as by screws 33 to the rear housing wall and is clamped to the cross bar by the rake. The rake may be swung about the arm pivots through a link 34 pivotally connected to one arm 35 of a lever 36, the latter in turn pivotally mounted on the adjacent side of the fan housing. The other arm 37 of the lever is pivotally connected to a rod 38 which extends rearwardly along one side of the frame structure 5 and is pivotally connected at its rear end to a hand lever 39 conveniently located near the handle 7. This hand lever is pivotally mounted on the adjacent side frame 12 of the frame structure, and is provided with a suitable stop 40 which engages the adjacent side frame when the rake is in its raised position to hold the rake in such position. When the lever is swung into its opposite position with the rake lowered, the stop 40 engages the adjacent side frame to prevent further downward movement of the rake. When the machine is moved forwardly over the ground surface with the rake in its lowered position, the leaves or other loose material are gathered in advance of the rake so that the air which is drawn into the nozzle between the rake teeth moves the accumulated leaves upwardly into the nozzle, up through the duct 17, and rearwardly through the discharge passage 18 into the collecting bag 8. By the provision of the sharp edges of the fan blade, the leaves are chopped up or shredded as they are gathered, thereby resulting in better decomposition of the leaves when used for compost purposes. The bag may be readily detached from the frame structure simply by loosening the drawstring 9, and releasing the clips 11, for emptying purposes. The rake in the event the rake teeth encounter some obstruction may be readily raised by the hand lever to permit passage thereof over such obstruction.

As a result of this invention an improved sweeping and shredding apparatus is provided for gathering leaves or similar loose material from an uneven ground surface, for shredding the material so gathered and for depositing the shredded leaves in a suitable receptacle on the machine. By the provision of the rake and flexible closure shield arranged in the manner disclosed with respect to the suction nozzle, the air is drawn toward the nozzle from a rearward direction and flows between the teeth of the rake so that the leaves accumulated in advance of the rake are effectively drawn into the machine. The flexible rubberlike shield at the front of the nozzle is yieldingly maintained in contact with the ground surface and may freely pass over the material to be gathered and any obstructions as the machine is moved forwardly, and by its provision the drawing in of any substantial volume of air at the front of the nozzle is prevented. The sharpened edges of the suction fan effectively shred the leaves, so that better decomposition of the leaves when used for compost purposes, results. The machine is not only simple in design and light in weight enabling easy guiding and propelling thereof, but is also extremely rugged in construction, well adapted for the purpose intended. Other advantages will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or scope of the appended claims.

What I claim as new and desire to secure by Letters Patent is:

1. In a vacuum type leaf sweeper, a portable frame adapted to run along a ground surface, a fan comprising a housing carried by said frame and having a transverse suction nozzle arranged with its mouth near the ground whereby leaves collected on the ground are drawn into said nozzle, and a rake mounted on said frame exteriorly of said nozzle and having a transverse rigid row of rake teeth normally disposed rearwardly of and in adjacency to said nozzle with said teeth normally disposed near the ground surface for collecting leaves in adjacency to said nozzle-mouth as the sweeper is advanced over the ground.

2. A leaf sweeper as set forth in claim 1 wherein a flexible closure is provided on said frame at the forward side of said nozzle and yieldingly engaging the ground surface in advance of said nozzle-mouth for causing the air drawn into the nozzle mouth to flow from a rearward direction forwardly between said rigid row of rake teeth prior to its entering the nozzle mouth so that the collected leaves are moved forwardly from the rake-teeth into said nozzle.

3. A leaf sweeper as set forth in claim 1 wherein an adjustable mounting is provided on said housing for said rake for adjusting said transverse rigid row of rake teeth in a vertical direction to vary the relation of said teeth with respect to the ground surface, and means for adjusting said rake on said adjustable mounting and for holding the same in its adjusted position.

4. A leaf sweeper as set forth in claim 3 wherein said adjustable mounting for said rake includes a horizontal transverse pivot for said rake whereby the latter may be swung upwardly and downwardly to move the rake teeth along an arcuate path rearwardly of said nozzle, and means located on the sweeper at a point remote from said rake for swinging the latter on its pivot.

5. In a vacuum type leaf sweeper, a portable frame movable over the ground, a fan device on said frame and having a suction nozzle disposed transversely on said frame and having its mouth near the ground surface, and a flexible shield on said frame arranged transversely in advance of said nozzle and yieldingly engaging the ground surface forwardly of the nozzle-mouth to provide air flow directing means to effect flow of the incoming air, in the main, from a rearward direction forwardly toward said nozzle-mouth.

6. In a vacuum type leaf sweeper, a portable frame movable over the ground, a fan device on said frame and having a suction nozzle disposed transversely of said frame with its mouth near the ground surface, a flexible shield on said frame and arranged transversely in advance of said nozzle and yieldingly engaging the ground surface forwardly of the nozzle mouth to provide an air directing shield to cause the incoming air, in the main, to flow from a rearward direction forwardly toward said nozzle-mouth, and a rake adjustably mounted on said frame and having a transverse rigid row of teeth disposed exteriorly of said nozzle near the ground surface at the rear side of said nozzle for collecting leaves in the vicinity of said nozzle as the sweeper is advanced over the ground, the incoming air flowing forwardly between the teeth of said rake as it flows to said nozzle-mouth.

7. In a vacuum type leaf sweeper, a frame movable over a ground surface and having manual guiding and propelling means, a rake mounted on said frame and having a transverse rigid row of teeth disposed near the ground surface for gathering leaves as the sweeper is moved forwardly over the ground, and a suction device on said frame having a transverse nozzle-mouth located near the ground surface in advance of and in adjacency to said transverse row of rake teeth whereby the leaves gathered by said rake are drawn forwardly from the rake-teeth into the nozzle-mouth.

8. In a vacuum type leaf sweeper, a frame movable over a ground surface and having manual and propelling means, a rake mounted on said frame and having a transverse rigid row of teeth disposed near the ground surface for gathering leaves as the sweeper is advanced forwardly over the ground, means for mounting said rake for up and down adjustment on said frame to vary the relation of said rake-teeth with respect to the ground surface, a suction device on said frame having a transverse nozzle located in advance of and in adjacency to said rake and having its mouth disposed near the ground surface forwardly of said rake-teeth whereby the leaves gathered by said rake are drawn forwardly from the rake-teeth into the nozzle-mouth, said rake mounted on said frame exteriorly of said nozzle, and means operable at will from a rearwardly located point on the sweeper in adjacency to said guiding and propelling means for effecting adjustment of said rake mounting means.

9. In a vacuum type leaf sweeper, the combination comprising a mobile base movable over the ground, a blower mechanism on said base and including a transverse suction nozzle having its mouth disposed near the ground surface, a toothed-rake on said base having a transverse rigid row of rake teeth arranged rearwardly and exteriorly of said nozzle for collecting leaves on the ground in the vicinity of said nozzle near the ground, means for movably mounting said rake on said base for movement between a lowered position at the ground level and a raised position above the ground, and a flexible closure secured to said base and to said movable rake and yieldable upon movement of said rake upon its mounting, said closure aiding in the directing of the incoming air from a rearward direction forwardly between the rake teeth near the ground surface.

10. In a vacuum type leaf sweeper, the combination comprising a mobile base movable over the ground, a blower mechanism on said base and having a transverse suction nozzle having its mouth disposed near the ground surface, a flexible closure on said base at the forward side of said nozzle and yieldingly engaging the ground surface in front of the nozzle mouth, a toothed-rake on said base having a transverse rigid row of rake teeth arranged rearwardly of said nozzle for collecting leaves in the vicinity of said nozzle, means for movably mounting said rake on said base for movement between a lowered position at the ground level and a raised position above the ground, and a flexible closure secured to said base and to said movable rake and yieldable upon movement of said rake and its mounting, said flexible closures cooperating to direct the incoming air from a rearward direction between the rake teeth forwardly to said nozzle.

11. In a vacuum type leaf sweeper, a portable frame movable over the ground, an air suction device carried by said frame for gathering leaves on the ground, said device having a housing arranged at the forward portion of said frame, said housing having a discharge opening through which the leaves gathered by said suction device are forcibly discharged in a rearward direction, a relatively large capacity baglike receptacle of loosely woven material arranged generally lengthwise on said frame centrally between the sides of the latter and in substantial longitudinal alignment with said device rearwardly of the latter, said baglike receptacle having its mouth communicating with said discharge opening whereby the leaves are discharged rearwardly through said opening directly into said receptacle in which the leaves are collected, detachable means for securing said receptacle at its mouth to said housing externally of said circular discharge opening, and detachable means engaging said receptacle at points spaced lengthwise thereof for detachably supporting said receptacle on said frame and said receptacle when filled being readily bodily detachable from said supporting means and said housing upon release of said detachable means.

12. In a vacuum type leaf sweeper, a pneumatic suction device comprising a housing providing a transverse suction nozzle, a transverse axle secured to the front wall of said housing, front wheels journaled on said axle at the sides of said housing, a frame structure secured to said housing and having cooperating frame elements extending longitudinally rearwardly of said housing and providing a rearwardly located frame, a swiveled, centrally located, rear wheel for supporting the rearward portion of said frame structure and having a mounting on which the wheel is journaled and to which said frame elements are secured, and a flexible shield secured to said front housing wall below said axle and extending across said housing, said shield yieldingly engaging the ground in advance of and extending below said open bottom of said housing to increase the suction-effect near the ground surface whereby leaves on the ground are pneumatically gathered by said device.

13. A leaf sweeper as set forth in claim 12 wherein a swingable rake is provided which has a transverse row of teeth which, when the rake is swung downwardly into its lowered position, are disposed at the ground surface rearwardly of said nozzle-providing-portion of said housing, and means is provided for pivotally mounting said rake at the outer sides of said housing.

14. A leaf sweeper as set forth in claim 13 wherein a flexible enclosure is secured to the rear wall of said housing and is disposed rearwardly of the rake-pivot and is secured at its lower edge to said rake for directing incoming air from a rearward direction forwardly between the teeth of the lowered rake to said nozzle-providing-portion of said housing.

15. In a vacuum type leaf sweeper, a portable frame adapted to travel over the ground, a pneumatic suction device carried by said frame for gathering leaves from the ground, said device having a housing arranged at the front end of said frame, said housing having a discharge opening through which the leaves are forcibly discharged from said housing, a relatively large capacity loosely woven bag arranged longitudinally on said frame in substantial longitudinal alignment with said device, said bag having its mouth communicating with said discharge opening whereby the leaves are discharged rearwardly through said opening directly into said bag, means for releasably attaching said bag-mouth to said housing around the outside of said discharge opening, and detachable means on said frame and comprising spaced upper, horizontal, side frame elements having clips engaging said bag at longitudinally spaced points for supporting the upper portion of said bag in its longitudinal position on said frame while the lower portion of said bag rests on its side on said frame, said releasable means being releasable and said detachable means being detachable readily to permit bodily removal of the filled bag from its supporting means and said housing.

JOSEPH F. JOY.

References Cited in the file of this patent
UNITED STATES PATENTS

| Number | Name | Date |
|---|---|---|
| 1,347,733 | Davis | July 27, 1920 |
| 1,992,820 | Gedney | Feb. 26, 1935 |
| 2,105,803 | Barnes | Jan. 18, 1938 |
| 2,222,380 | Statler | Nov. 19, 1940 |
| 2,242,922 | Poynter | May 20, 1941 |
| 2,328,713 | Dowd et al. | Sept. 7, 1943 |
| 2,349,386 | Stoetzl et al. | May 23, 1944 |
| 2,538,643 | Gregory | Jan. 16, 1951 |